US012553608B1

(12) United States Patent
Weber et al.

(10) Patent No.: US 12,553,608 B1
(45) Date of Patent: Feb. 17, 2026

(54) ADDITIVELY MANUFACTURED COMBUSTOR LINER V-BAND COOLING RING

(71) Applicant: PRATT & WHITNEY CANADA CORP., Longueuil (CA)

(72) Inventors: Jacob Weber, Toronto (CA); Assaf Farah, Brossard (CA); Pierrot Duchesne, Saint-Basile-le-Grand (CA); Katherine Little, Toronto (CA); Daniel Plante, Terrebonne (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/013,516

(22) Filed: Jan. 8, 2025

(51) Int. Cl.
*F23R 3/00* (2006.01)
*F01D 9/02* (2006.01)
*B33Y 80/00* (2015.01)

(52) U.S. Cl.
CPC .............. *F23R 3/002* (2013.01); *F01D 9/023* (2013.01); *B33Y 80/00* (2014.12); *F23R 2900/03044* (2013.01)

(58) Field of Classification Search
CPC ............. F23R 3/002; F23R 3/50; F01D 9/023
See application file for complete search history.

(56) References Cited

U.S. PATENT DOCUMENTS 4,984,429 A * 1/1991 Waslo ...................... F23R 3/002 60/757
5,117,636 A * 6/1992 Bechtel, II .............. F23R 3/002 60/738
6,269,628 B1 * 8/2001 Gates ...................... F01D 9/023 60/804
6,711,900 B1 * 3/2004 Patel ......................... F23R 3/60 60/757
7,441,409 B2 10/2008 Patel et al.
11,668,462 B1 * 6/2023 Benjamin ................. F23R 3/06 60/752
12,085,283 B2 9/2024 Ganiger et al.
2005/0144954 A1 * 7/2005 Lemon ...................... F23R 3/42 60/752
2018/0149361 A1 * 5/2018 Burd ........................ F23R 3/005
2018/0156459 A1 * 6/2018 Clemen ..................... F23R 3/06
2022/0260016 A1 * 8/2022 Dudebout ................. F23R 3/54
2023/0055939 A1 2/2023 Binek et al.

* cited by examiner

*Primary Examiner* — Gerald L Sung
(74) *Attorney, Agent, or Firm* — Kinney & Lange, P.A.

(57) ABSTRACT

A v-band ring and a combustor incorporating the same includes a monolithic body extending circumferentially entirely about an axis and extending axially parallel to the axis from ends of the v-band ring. The monolithic body includes an inner surface that faces inward towards the axis and extends between ends of the v-band. The inner surface includes a convergent frustoconical segment, a convex segment, and a divergent frustoconical segment that form a V-shaped cross-section of the monolithic body with a rounded vertex.

12 Claims, 6 Drawing Sheets

ADDITIVELY MANUFACTURED COMBUSTOR LINER V-BAND COOLING RING

BACKGROUND

The invention relates to combustor liners, and more specifically to combustor v-band rings that provide cooling as well as promote beneficial flow characteristics within the combustor.

Gas turbine engine combustors utilize cooling holes to thermally protect combustor walls and/or combustor liners from the heat of combustion. In some instances, v-band louvers and/or v-band rings are used to direct cooling air along the combustor liner in the upstream direction and the downstream direction relative to a flow through the combustor. While prior v-band designs are considered suitable for their intended purpose, improved cooling and/or improved louver construction is highly desirable.

SUMMARY

A v-band ring according to an example embodiment of this disclosure includes a monolithic body extending circumferentially entirely about an axis and extending axially parallel to the axis from a first end to a second end. The monolithic body includes an inner surface that faces inward towards the axis and extends from a first end to a second end. The inner surface includes a convergent frustoconical segment, a convex segment, and a divergent frustoconical segment that form a V-shaped cross-section of the monolithic body with a rounded vertex.

A combustor according to another example embodiment of this disclosure includes an inner wall, an outer wall, and a head wall that form boundaries of a combustion chamber. The inner wall circumscribes an axis. The outer wall is spaced outward relative to the inner wall. The inner wall, the outer wall, or both the inner wall and the outer wall includes a v-band ring. The head wall extends from the inner wall to the outer wall to enclose an upstream end of the combustor. The v-band includes a monolithic body extending circumferentially entirely about an axis and extending axially parallel to the axis from a first end to a second end. The monolithic body includes an outer surface and an inner surface. The outer surface faces away from the combustion chamber and extends from the first end to the second end. The inner surface faces inward towards the combustion chamber and extends from the first end to the second end. The inner surface includes a convergent frustoconical segment, a convex segment, and a divergent frustoconical segment that form a V-shaped cross-section of the monolithic body with a rounded vertex.

DETAILED DESCRIPTION

As described herein, a v-band ring includes scoops along an inner surface that are integrally formed with the body of the v-band ring. Scoops include passages that are oriented for promoting beneficial flow patterns within a combustor and providing cooling to the inner surface of the v-band ring and, in some examples, adjacent regions of combustor walls or combustor liners. The v-band ring thereby provides benefits of prior v-band designs while improving mechanical performance of the v-band ring by eliminating mechanical joints between the scoops and the v-band ring. Further, development of the v-band ring configuration can be rapidly modified through subsequent design iterations of v-band ring, improving cost of manufacturing and/or repair.

Figure 1:
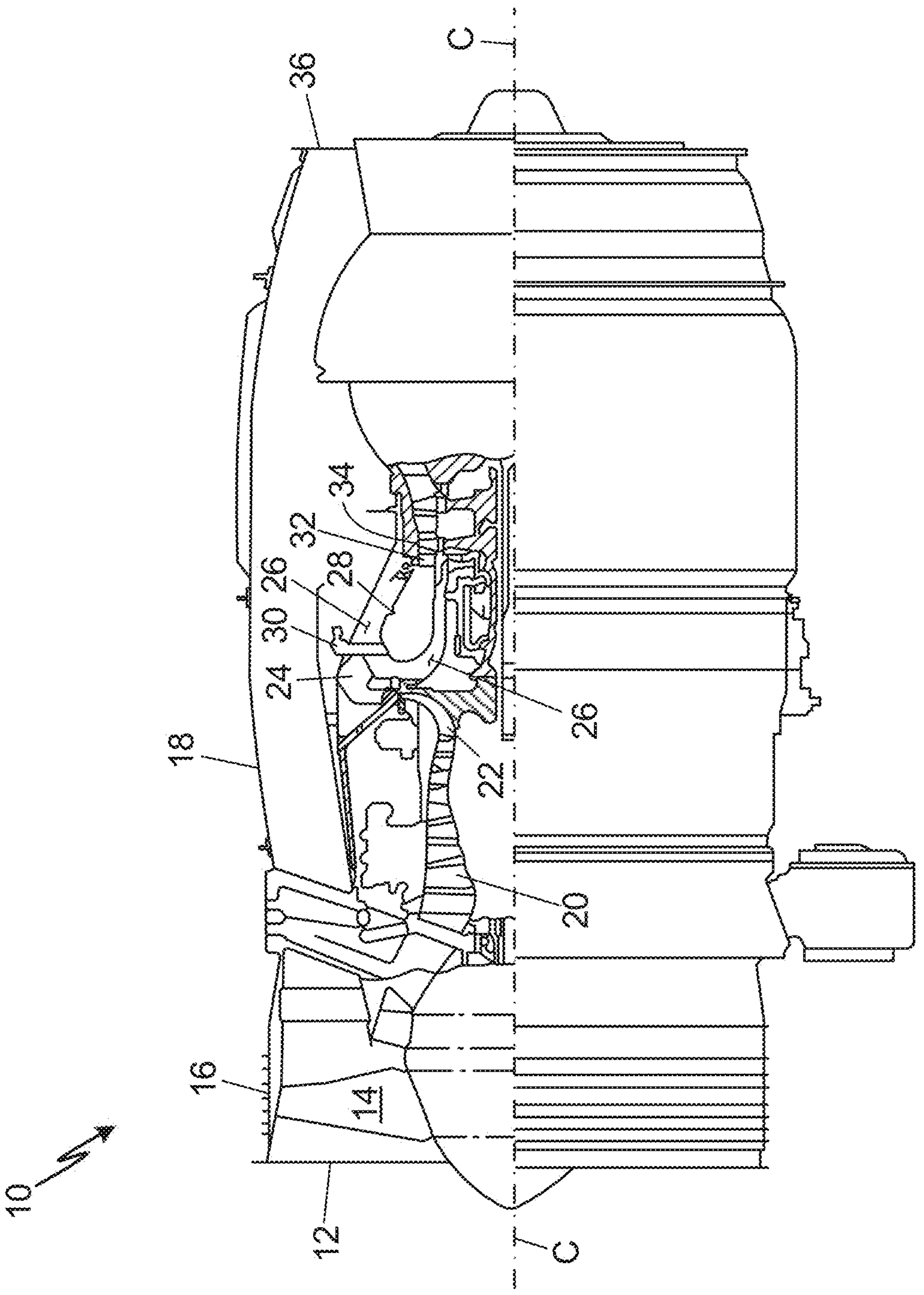
FIG. 1 is an axial cross-section through an example gas turbine engine.

FIG. 1 is an axial cross-section through an example gas turbine engine 10 that can be equipped with a combustor with a v-band ring described herein. While gas turbine engine 10 is depicted as a turbofan engine, one or more v-band rings can be incorporated into combustors of other types of gas turbine engines. In some examples, gas turbine engine 10 can be a turboshaft engine or a turboprop engine suitable for propulsion of an aircraft and/or providing power to an auxiliary system of the aircraft (e.g., an auxiliary power unit). In other examples, gas turbine engine 10 can be a ground-based industrial gas turbine engine or an aeroderivative gas turbine engine. Further, gas turbine engine 10 can include fewer or more compressor stages and/or turbine stages than the number of stages depicted by FIG. 1 and said stages can be configured as axial compressors and/or turbines, or centrifugal compressors and/or turbines arranged to form fewer or more shaft spools than the configuration depicted in FIG. 1.

As depicted in FIG. 1, gas turbine engine 10 includes inlet 12, fan 14, fan case 16, bypass duct 18, low-pressure axial compressor 20, high-pressure centrifugal compressor 22, diffuser 24, plenum 26, combustor 28, fuel tubes 30, nozzle guide vane 32, turbines 34, and exhaust nozzle 36. Air intake into gas turbine engine 10 through inlet 12 passes over fan 14 in fan case 16 and is then split into an outer annular flow through the bypass duct 18 and an inner flow through the low-pressure axial compressor 20 and high-pressure centrifugal compressor 22. Compressed air exits high-pressure centrifugal compressor 22 through diffuser 24 and is contained within plenum 26 that surrounds combustor 28. Fuel supplied to combustor 28 through fuel tubes 30 mixes with air supplied from plenum 26 when sprayed through nozzles into combustor 28 as a fuel air mixture and is ignited. A portion of the compressed air within plenum 26 is admitted into combustor 28 through orifices in the side walls to create a cooling air film along the combustor walls or is used for cooling, which eventually mixes with the hot gases from combustor 28 and passes over nozzle guide vane 32 and turbines 34 before exiting nozzle 36 as exhaust. It will be understood that the foregoing description is intended to be exemplary of only one of many possible configurations of engine suitable for incorporation of the present invention.

Figure 2:
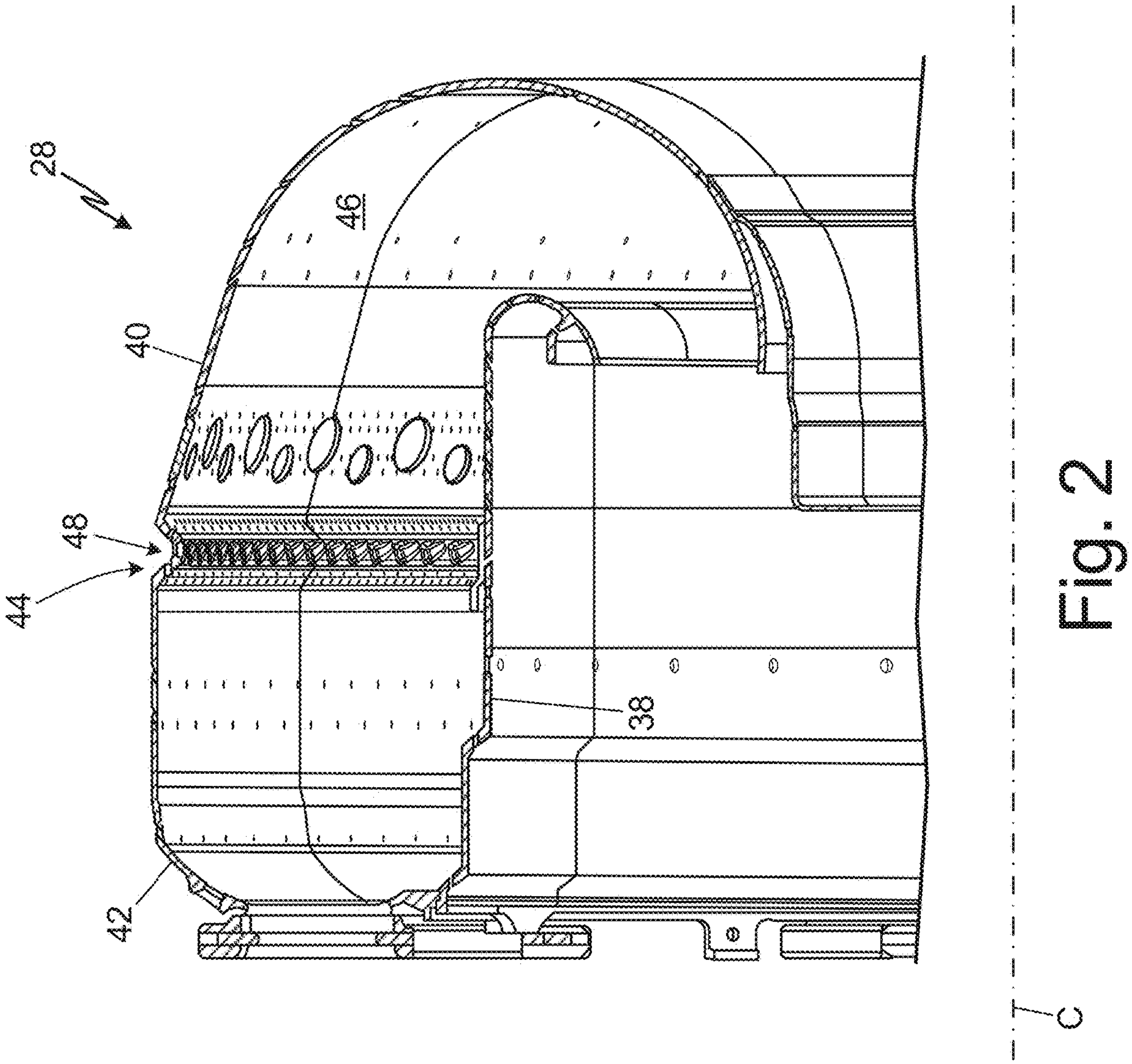
FIG. 2 is an axial cross-section through a combustor of the example gas turbine engine that includes a v-band ring.

FIG. 2 is an axial cross-section of combustor 28 with inner wall 38, outer wall 40, head wall 42 (collectively liner walls), and v-band ring 44. Inner wall 38 is spaced radially inward from outer wall 40 relative to centerline axis C to form annular combustion chamber 46. Head wall 42 extends from inner wall 38 to outer wall 40 to enclose an upstream end of combustor 28. Fuel tube 30 communicates with combustion chamber 46 via a port extending through head wall 42, however, the fuel nozzle arrangement is not shown, for simplicity. An ignitor extends through a port of outer wall 40 and is positioned in relation to one or more fuel tubes 30 to initiate combustion within combustion chamber 46.

V-band ring 44 forms a section of inner wall 38 and/or outer wall 40 and is spaced downstream from ignitor (not shown) and head wall 42. Examples of combustor 28 can include v-band ring 44 disposed between a primary combustor zone into which fuel is injected and a downstream zone into which additional air is introduced for mixing with fuel for combustion as shown in FIG. 2. V-band ring 44 includes one or more cooling passages 48 that fluidly connect plenum 26 to combustion chamber 46 for distributing air along an inner surface of v-band ring 44 and outer wall 40 in an upstream direction (i.e., towards head wall 42) and/or in a downstream direction (i.e., towards turbine 34).

Figure 3:
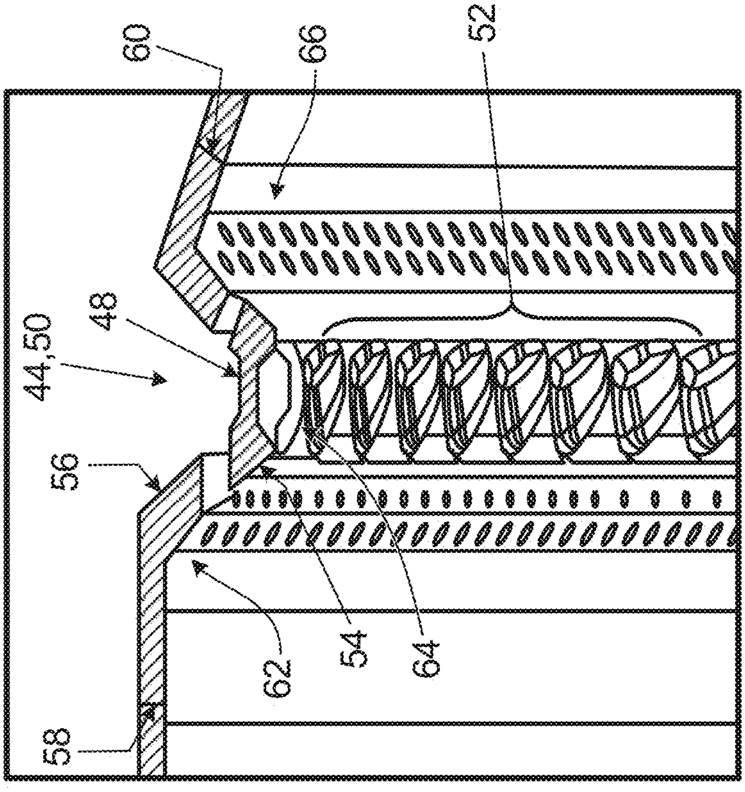
FIG. 3 is an enlarged cross-sectional view of the v-band ring from FIG. 2.
Figure 4:
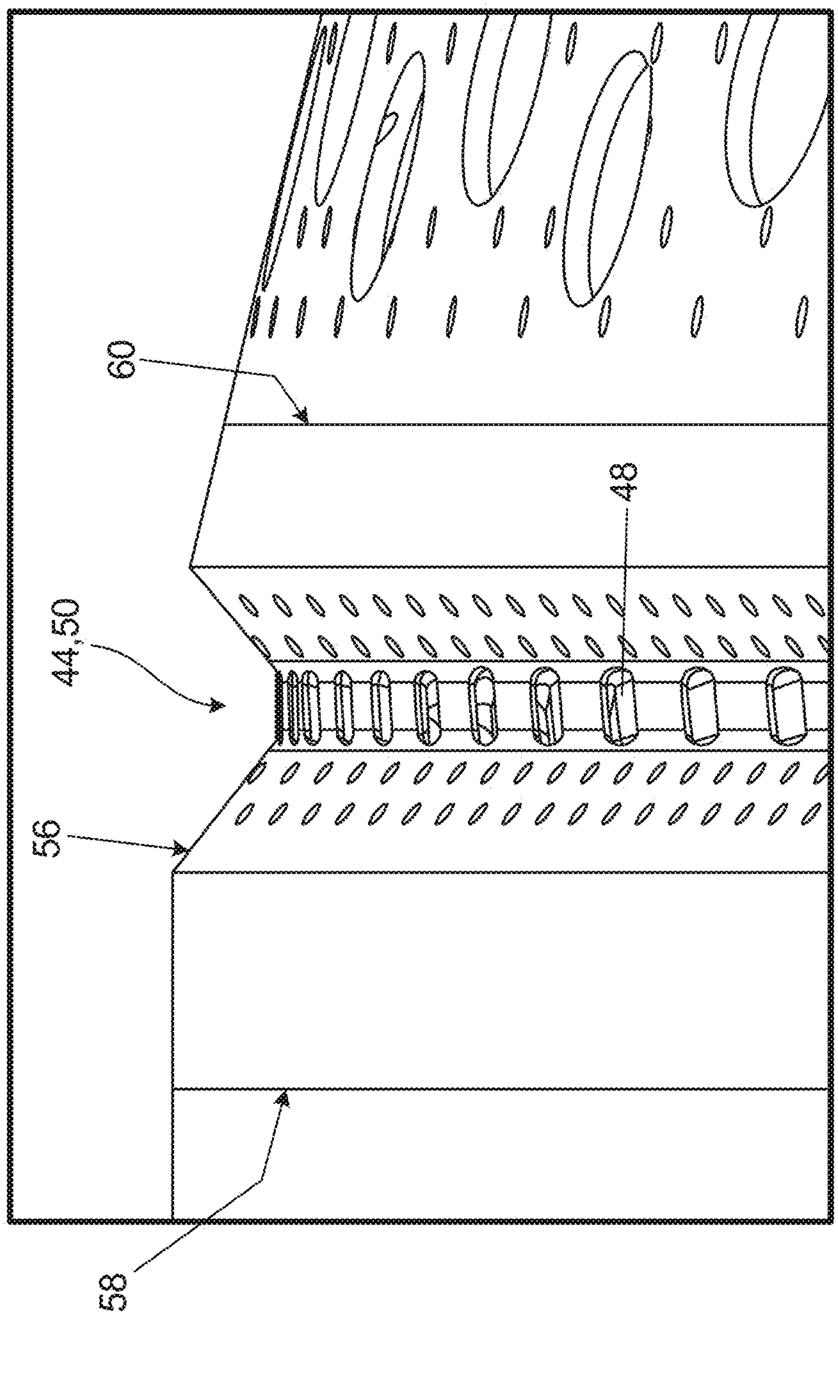
FIG. 4 is a perspective view of the v-band ring depicting an outer side of the combustor and v-band.

FIG. 3 is an enlarged cross-sectional view of v-band ring as depicted in FIG. 2. FIG. 4 is a perspective view of v-band ring 44 depicted from an exterior of combustor 28. FIG. 3 and FIG. 4 are discussed together below. While the example depicted by FIG. 2, FIG. 3, and FIG. 4 show v-band ring 44 as part of outer wall 40, v-band ring 44 can be incorporated into inner wall 38 in other examples. Features of v-band ring 44 described below in reference to outer wall 40 can be applied to inner wall 38 in such examples.

V-band ring 44 includes a monolithic body 50 and scoops 52 formed integrally with monolithic body 50 such that no weld joint and/or braze joint exists between scoops 52 and monolithic body 50. Monolithic body 50 includes inner surface 54 and outer surface 56 that extend axially along axis C from first end 58 to second end 60. Inner surface 54 faces towards and forms a boundary of combustion chamber 46. Outer surface 56 faces away from combustion chamber 46. Inner surface 54 and/or outer surface 56 include, in series, frustoconical segment 62, convex segment 64, and frustoconical segment 66. Frustoconical segment 62 of inner surface 54 converges (i.e., decreasing radial dimension) in a direction from first end 58 to convex section (i.e., convergent frustoconical segment 62). Frustoconical segment 66 of inner surface 54 diverges (i.e., increasing radial dimension) in a direction from convex section to second end 60 (i.e., divergent frustoconical segment 66). Convex segment 64 joins converging frustoconical segment 62 to divergent frustoconical segment 66.

Scoops 52 are arranged in a circumferential array along inner surface 54 and are integrally formed with monolithic body 50. Passages 48 extend through monolithic body 50 from outer surface 56 through scoop 52 to fluidly connect a region exterior to outer wall 40 (e.g., plenum 26) a region interior to outer wall 40 (i.e., combustion chamber 46). Each scoop 52 and associated passage 48 has an orientation with a radially inward component combined with one of 1) a tangential orientation about axis C, 2) an upstream orientation towards head wall 42 or towards first end 58 of monolithic body 50, and 3) a downstream orientation away from head wall 42 or towards second end 60 of monolithic body 50. In some examples of v-band ring 44, each scoop 52 and passage 48 have the same orientation, each scoop 52 and passage 48 oriented radially inward and tangential, each scoop 52 and passage 48 oriented radially inward and upstream, or each scoop 52 and passage 48 oriented radially inward and downstream. In other examples, at least one scoop 52 and associated passage 48 can have a different orientation than the other scoops 52 and passages 48.

Figure 5:
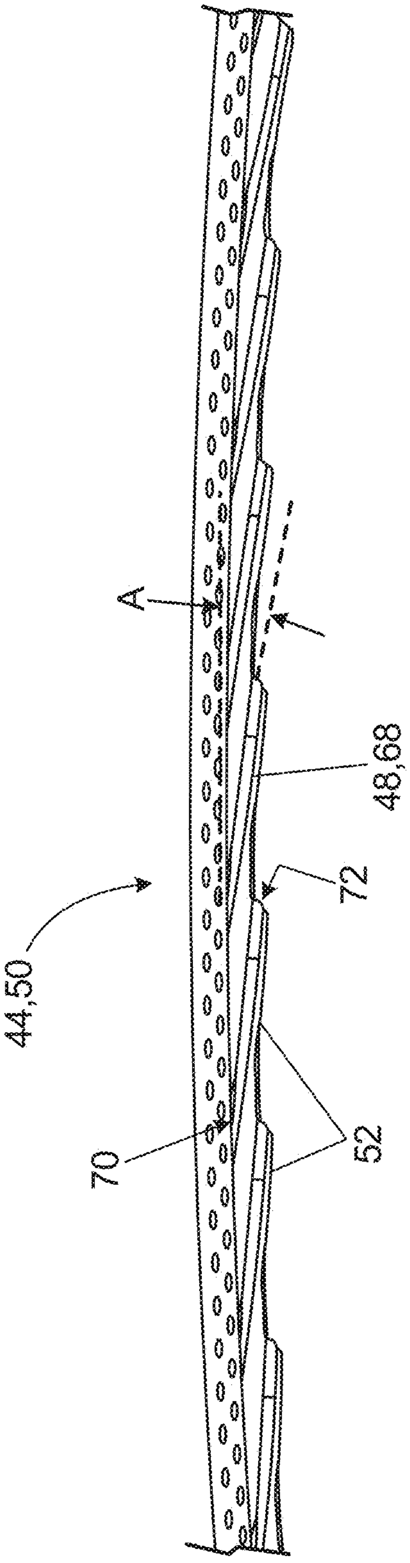
FIG. 5 is a cross-sectional view through v-band scoops depicting an example passage.

V-band ring 44 can include one or more passages 67 extending through at least one of frustoconical segment 62 and frustoconical segment 66 to fluidly connect the region exterior to outer wall 40 (e.g., plenum 26) to the region interior to outer wall 40 (e.g., combustion chamber 46). In some examples, multiple passages 67 can form a circumferential array of passages 67 along frustoconical segment 62 and/or frustoconical segment 66 as depicted in FIG. 4 and FIG. 5. Passages 67 can be oriented to direct cooling fluid along outer wall 40. For example, passages 67 can be oriented be parallel to and/or form a shallow acute angle less than twenty degrees with a portion of outer wall 40 adjacent to frustoconical segment 62 and/or frustoconical segment 66.

FIG. 5 is a cross-sectional view extending through scoops 52 to illustrate an example passage 48. As depicted, passage 48 includes a single continuous segment 68, which extends from inlet 70 at outer surface 56 through scoop 52 to outlet 72 to fluidly connect a region exterior to v-band ring 44 (e.g., plenum 26) with a region interior to v-band ring 44 (e.g., combustion chamber 46). Passage 48 can include a constant cross-sectional area in some examples. In other examples, the cross-sectional area of passage 48 can vary along a length of passage from inlet 12 to outlet 72. For example, some passages 48 have larger cross-sectional areas at inlet 12 and proximate to inlet 12 to reduce static pressure loss due to cooling fluid entering passage 48 from plenum 26. Flow through passages 48 not only promotes toroidal flow patterns within combustion chamber 46 but also provides cooling to v-band ring 44, particularly radially inner portions of monolithic body 50 and scoops 52.

Figure 6:
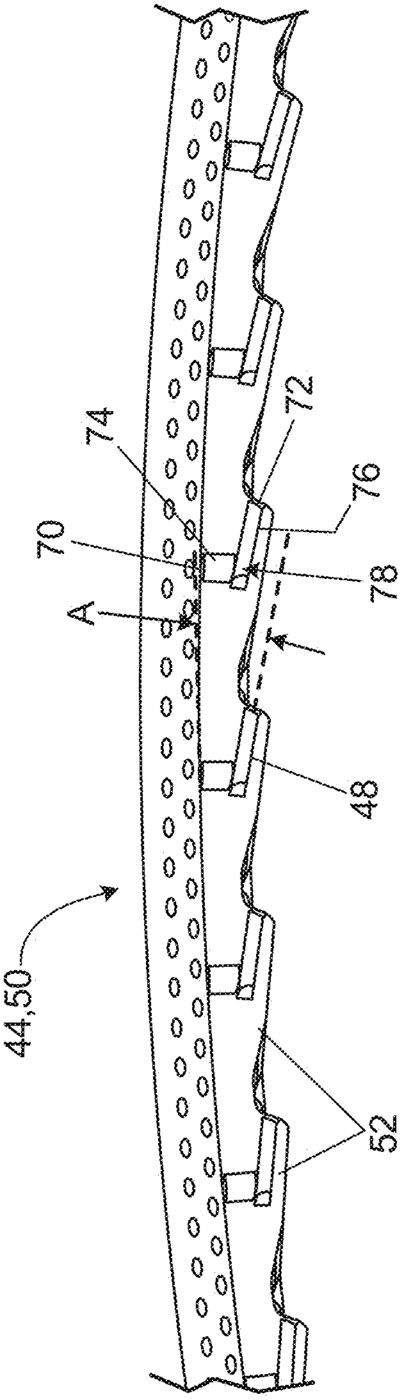
FIG. 6 is a cross-sectional view through v-band scoops depicting another example passage.

FIG. 6 is a cross-sectional view extending through scoops 52 to illustrate another example passage 48. In this example, passage 48 is formed by at least two passage segments, radial segment 74 and circumferential segment 76. Radial segment 74 extends radially inward from inlet 70 at outer surface 56 to intersection 80 within scoop 52. Circumferential segment 76 extends from intersection 80 to outlet 72 at the terminal end of scoop 52. Scoop 52 and circumferential segment 76 can be oriented radially inward combined with one of a tangential orientation, an upstream orientation, and a downstream orientation as described above in reference to passages 48 generally. In operation, cooling fluid flowing through radial segment 74 impinges on scoop 52 internally at intersection 80, increasing cooling of scoop 52 relative to passage 48 with a single continuous segment such as depicted in FIG. 5.

V-band ring 44 can be manufactured, for example, through an additive manufacturing process. In one example, a laser powder bed fusion process is used to manufacture monolithic body 50. Laser powder bed fusion process sequentially deposits layers of material powder, portions of each layer fused to prior layers via a laser. As each layer is formed, a base supporting monolithic body 50 translates to allow subsequent layers to be deposited and fused. The base can be temperature-controlled in order to influence material properties of monolithic body 50 during the manufacturing process. Certain features of monolithic body 50 can be formed after additive manufacturing via subtractive manufacturing processes such as conventional machining processes, electro-discharge machining and/or drilling, among other potential processes. Outer wall 40 of combustor 28 can be formed by joining v-band ring 44 to outer wall 40 via a brazing process and/or a welding process at first end 58 and second end 60. Accordingly, v-band ring 44 can be constructed from materials that are more difficult to machine using conventional machining processes while features of monolithic body 50 are produced with an as-finished, or a near as-finished condition that minimizes subsequent machining operations. Further, scoops 52 can be incorporated along inner surface 54 of v-band ring 44 as part of monolithic body 50 and does not require joining scoops 52 via brazing and/or welding, which improves mechanical performance of v-band ring 44.

Discussion of Possible Embodiments

The following are non-exclusive descriptions of possible embodiments of the present invention.

A v-Band Ring for a Gas Turbine Engine Combustor

A v-band ring according to an example embodiment of this disclosure, among other possible things, includes a monolithic body extending circumferentially entirely about an axis and extending axially parallel to the axis from a first end to a second end. The monolithic body includes an inner surface that faces inward towards the axis and extends from a first end to a second end. The inner surface includes a convergent frustoconical segment, a convex segment, and a divergent frustoconical segment that form a V-shaped cross-section of the monolithic body with a rounded vertex.

The v-band ring of the preceding paragraph can optionally include, additionally and/or alternatively, any one or more of the following features, configurations and/or additional components.

A further embodiment of the foregoing v-band ring, wherein the monolithic body can include an outer surface facing away from the axis and extending from the first end to the second end.

A further embodiment of any of the foregoing v-band rings, wherein the monolithic body can further include a plurality of scoops extending from and integrally formed with the convex segment of the inner surface.

A further embodiment of any of the foregoing v-band rings, wherein the monolithic body can further include a plurality of passages extending through the monolithic body, each passage extending from the outer surface through one of the plurality of scoops.

A further embodiment of any of the foregoing v-band rings, wherein each passage of the plurality of passages can be formed by a single continuous segment extending at an oblique angle to outer surface.

A further embodiment of any of the foregoing v-band rings, wherein each passage of the plurality of passages can be formed by a radial segment and a circumferential segment.

A further embodiment of any of the foregoing v-band rings, wherein the radial segment can extend from the outer surface radially inward to an intersection.

A further embodiment of any of the foregoing v-band rings, wherein the circumferential segment can extend at an oblique angle relative to the outer surface from the intersection point through the scoop.

A further embodiment of any of the foregoing v-band rings, wherein each passage of the plurality of passages can form an acute angle between a centerline and a tangent line of each passage, the centerline of each passage extending through a geometric center of an outlet of each passage and the tangent line tangent to the outer surface at an inlet of each passage.

A further embodiment of any of the foregoing v-band rings, wherein the acute angle can be greater than or equal to 5 degrees and less than or equal to 20 degrees.

A further embodiment of any of the foregoing v-band rings, wherein at least a tangential scoop of the plurality of scoops can include a passage extending parallel to a plane normal to the axis.

A further embodiment of any of the foregoing v-band rings, wherein at least an oblique scoop of the plurality of scoops can include an oblique passage of the plurality of passages extending tangentially about axis and axially relative to axis towards the first end or towards the second end of the monolithic body.

A further embodiment of any of the foregoing v-band rings, wherein each of the first end and the second end of the monolithic body can include a chamfer extending from the outer surface towards the first end or toward the second end and terminating between the outer surface and the inner surface.

A further embodiment of any of the foregoing v-band rings, wherein the first end and the second end can be spaced from the convergent frustoconical segment or the divergent frustoconical segment.

A further embodiment of any of the foregoing v-band rings can further include a plurality of passages extending through the first frustoconical segment and the second frustoconical segment to fluidly connect a region exterior to the monolithic body to a region interior of the monolithic body relative to the axis.

A Combustor and v-Band Ring for a Gas Turbine Engine

A combustor according to an example embodiment of this disclosure, among other possible things, includes an inner wall, an outer wall, and a head wall. The inner wall circumscribes an axis. The outer wall is spaced outward relative to the inner wall. The inner wall, the outer wall, or both the inner wall and the outer wall include a v-band ring. The head wall extends from the inner wall to the outer wall to enclose an upstream end of the combustor. The v-band includes a monolithic body extending circumferentially entirely about an axis and extending axially parallel to the axis from a first end to a second end. The monolithic body includes an outer surface and an inner surface. The outer surface faces away from the axis and extends from the first end to the second end. The inner surface faces inward towards the axis and extends from the first end to the second end. The inner surface includes a convergent frustoconical segment, a convex segment, and a divergent frustoconical segment that form a V-shaped cross-section of the monolithic body with a rounded vertex.

The combustor of the preceding paragraph can optionally include, additionally and/or alternatively, any one or more of the following features, configurations and/or additional components.

A further embodiment of the foregoing combustor, wherein the monolithic body can further include a plurality of scoops extending from and integrally formed with the convex segment of the inner surface.

A further embodiment of any of the foregoing combustors, wherein the monolithic body can further include a plurality of passages extending through the monolithic body, each passage extending from the outer surface through one of the plurality of scoops.

A further embodiment of any of the foregoing combustors, wherein each passage of the plurality of passages can be formed by a single continuous segment extending at an oblique angle to outer surface.

A further embodiment of any of the foregoing combustors, wherein each passage of the plurality of passages can be formed by a radial segment and a circumferential segment.

A further embodiment of any of the foregoing combustors, wherein the radial segment can extend from the outer surface radially inward to an intersection.

A further embodiment of any of the foregoing combustors, wherein the circumferential segment can extend at an oblique angle relative to the outer surface from the intersection point through the scoop.

A further embodiment of any of the foregoing combustors, wherein each passage of the plurality of passages can form an acute angle between a centerline and a tangent line of each passage, the centerline of each passage extending through a geometric center of an outlet of each passage and the tangent line tangent to the outer surface at an inlet of each passage.

A further embodiment of any of the foregoing combustors, wherein the acute angle can be greater than or equal to 5 degrees and less than or equal to 20 degrees.

A further embodiment of any of the foregoing combustors, wherein at least a tangential scoop of the plurality of scoops can include a passage extending parallel to a plane normal to the axis.

A further embodiment of any of the foregoing combustors, wherein at least an oblique scoop of the plurality of scoops can include an oblique passage of the plurality of passages extending tangentially about axis and axially relative to axis towards the first end or towards the second end of the monolithic body.

A further embodiment of any of the foregoing combustors, wherein an upstream scoop of the plurality of scoops can include an upstream passage of the plurality of passages extending tangentially about axis and axially relative to the axis towards the head wall.

A further embodiment of any of the foregoing combustors, wherein a downstream scoop of the plurality of scoops can include a downstream passage of the plurality of passages extending tangentially about the axis and axially relative to the axis away from the head wall.

A further embodiment of any of the foregoing combustors, wherein each of the first end and the second end of the monolithic body can include a chamfer extending from the outer surface towards the first end or toward the second end and terminating between the outer surface and the inner surface.

A further embodiment of any of the foregoing combustors, wherein the first end and the second end can be spaced from the convergent frustoconical segment or the divergent frustoconical segment.

A further embodiment of any of the foregoing combustors can further include a first connecting segment extending from the first end to the convergent frustoconical segment.

A further embodiment of any of the foregoing combustors can further include a second connecting segment extending from the divergent frustoconical segment to the second end.

A further embodiment of any of the foregoing combustors, wherein the first connecting segment and the second connecting segment can be tangent to respective portions of the inner wall or the outer wall at the first end and the second end.

A further embodiment of any of the foregoing combustors can further include a plurality of passages extending through the first frustoconical segment and the second frustoconical segment to fluidly connect a region exterior to the monolithic body to a region interior of the monolithic body relative to the axis.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A v-band ring for a gas turbine combustor, the v-band ring comprising:

a monolithic body extending circumferentially entirely about an axis and extending axially parallel to the axis from a first end to a second end, the monolithic body comprising:

an outer surface facing away from the axis and extending from the first end to the second end;

an inner surface facing inward towards the axis and extending from the first end to the second end, wherein the inner surface includes a convergent frustoconical segment, a convex segment, and a divergent frustoconical segment that form a V-shaped cross-section of the monolithic body with a rounded vertex;

a plurality of scoops extending from and integrally formed with the convex segment of the inner surface; and a plurality of passages extending through the monolithic body, each passage extending from the outer surface through one of the plurality of scoops;

wherein the convergent frustoconical segment has a decreasing radial dimension in a direction from the first end towards the convex segment, and wherein the divergent frustoconical segment has an increasing radial dimension in a direction from the convex segment towards the second end, and wherein at least an oblique scoop of the plurality of scoops includes an oblique passage of the plurality of passages extending tangentially about the axis and axially relative to axis towards the first end of the monolithic body.

2. The v-band ring of claim 1, wherein each passage of the plurality of passages is formed by a single continuous segment extending at an oblique angle to the outer surface.

3. The v-band ring of claim 1, wherein each passage of the plurality of passages is formed by a radial segment and a circumferential segment, and wherein the radial segment extends from the outer surface radially inward to an intersection point, and wherein the circumferential segment extends at an oblique angle relative to the outer surface from the intersection point through the scoop.

4. The v-band ring of claim 1, wherein each passage of the plurality of passages forms an acute angle between a centerline and a tangent line of each passage, the centerline of each passage extending through a geometric center of an outlet of each passage and the tangent line tangent to the outer surface at an inlet of each passage.

5. The v-band ring of claim 4, wherein the acute angle is greater than or equal to 5 degrees and less than or equal to 20 degrees.

6. The v-band ring of claim 1, wherein the first end is axially spaced from the convergent frustoconical segment, and wherein the second end is axially spaced from the divergent frustoconical segment.

7. A combustor comprising:

an inner wall circumscribing an axis;

an outer wall spaced outward relative to the inner wall, wherein the inner wall, the outer wall, or both the inner wall and the outer wall comprising a v-band ring; and a head wall extending from the inner wall to the outer wall to enclose an upstream end of the combustor;

wherein the v-band ring comprises:

a monolithic body extending circumferentially entirely about the axis and extending axially parallel to the axis from a first end to a second end, the monolithic body comprising:

an outer surface facing away from the axis and extending from the first end to the second end;

an inner surface facing inward towards the axis and extending from the first end to the second end, wherein the inner surface includes a convergent frustoconical segment, a convex segment, and a divergent frustoconical segment that form a V-shaped cross-section of the monolithic body with a rounded vertex;

a plurality of scoops extending from and integrally formed with the convex segment of the inner surface; and a plurality of passages extending through the monolithic body, each passage extending from the outer surface through one of the plurality of scoops;

wherein the convergent frustoconical segment has a decreasing radial dimension in a direction from the first end towards the convex segment, and wherein the divergent frustoconical segment has an increasing radial dimension in a direction from the convex segment towards the second end, and wherein at least an oblique scoop of the plurality of scoops includes an oblique passage of the plurality of passages extending tangentially about the axis and axially relative to axis towards the first end of the monolithic body.

8. The combustor of claim 7, wherein each passage of the plurality of passages is formed by a single continuous segment extending at an oblique angle to outer surface.

9. The combustor of claim 7, wherein each passage of the plurality of passages is formed by a radial segment and a circumferential segment, and wherein the radial segment extends from the outer surface radially inward to an intersection point, and wherein the circumferential segment extends at an oblique angle relative to the outer surface from the intersection point through the scoop.

10. The combustor of claim 7, wherein an upstream scoop of the plurality of scoops includes an upstream passage of the plurality of passages extending tangentially about axis and axially relative to the axis towards the head wall.

11. A v-band ring for a gas turbine combustor having a circumferentially extending wall, the v-band ring comprising:

a monolithic body extending circumferentially entirely about an axis and extending axially parallel to the axis from a first end to a second end, the monolithic body comprising:

an inner surface facing inward towards the axis and extending from the first end to the second end, wherein the inner surface includes, in series, a first frustoconical segment, a convex segment, and a second frustoconical segment that form a V-shaped cross-section of the monolithic body with a rounded vertex;

a plurality of scoops extending from and integrally formed with the convex segment of the inner surface; and a plurality of passages extending through the monolithic body, each passage extending through one of the plurality of scoops;

wherein at least an oblique scoop of the plurality of scoops includes an oblique passage of the plurality of passages extending tangentially about the axis and axially relative to axis towards the first end of the monolithic body.

12. The v-band ring of claim 11, further comprising a plurality of passages extending through the first frustoconical segment and the second frustoconical segment to fluidly connect a region exterior to the monolithic body to a region interior of the monolithic body relative to the axis.

* * * * *